United States Patent Office 3,538,149
Patented Nov. 3, 1970

3,538,149
POLY(α,β-UNSATURATED BENZYL ESTERS)
Joseph Adrian Hoffman, Somerville, N.J., assignor to American Cyanamid Company, Stamford, Conn., a corporation of Maine
No Drawing. Filed Sept. 28, 1966, Ser. No. 582,526
Int. Cl. C07c 69/54, 69/56
U.S. Cl. 260—486                                              4 Claims

ABSTRACT OF THE DISCLOSURE

The compounds represented by the formula:

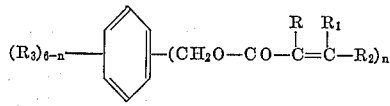

where R, $R_1$, and $R_2$ may be hydrogen, halogen, lower alkyl of up to four carbons, or phenyl; $R_3$ may be hydrogen or lower alkyl of up to four carbons; and $n$ is an integer from 3 to 6 provided that when $n$ is 3, the radicals are located on the 1,3,5-positions of the phenyl ring. These compounds are useful in preparing cross-linking agents for carboxy-terminated polybutadiene by reaction with an alkyleneimine.

---

This invention relates to benzyl esters of α,β-unsaturated acids. More particularly, it relates to esters of α,β-unsaturated acids of the formula

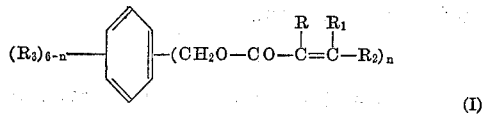

(I)

where R, $R_1$, and $R_2$ may be hydrogen or lower alkyl; $R_3$ may be hydrogen or lower alkyl; and $n$ is an integer from 3 to 6 provided that when $n$ of the expression 6-n is 3, $R_3$ is a 1,3,5-trimethyl substitution.

In copending application, Ser. No. 582,527, filed Sept. 28, 1966, aziridine adducts of benzyl esters of α,β-unsaturated acids are disclosed as new compositions of matter useful in the modification or curing of compounds or polymers reactive therewith. None of these benzyl esters are known in the literature yet nonetheless, are considered to be all compounds useful in the preparation of specific aziridine adducts and for other uses.

The specific aziridine adducts referred to above are those containing a minimum of three aziridine groups per molecule. Thus, in structure (I) above, the value for $n$ would be three or more and three moles per molecule or more of an imine would be reacted with the ester through the double bonds present. The resulting adducts would contain at least three aziridine groups which are useful in cross-linking difunctional polymers. Aziridine adducts containing less than three reactive groups are not capable of cross-linking difunctional polymers, nor are reactants of other chemical varieties having less than three reactive groups.

A specific utility of cross-linking agents containing three or more functional groups is in connection with the production of solid rocket fuels. Carboxy-containing polymers have found use as ingredients in the composition of a solid rocket fuel. Such polymers originally are present in the liquid state and the solid fuels result by gelling of the fuel components with suitable curing or gelation agents. In effecting gelation, the fuel mix must be thoroughly blended with the gelling agent to ensure product uniformity; then after blending, the liquid mixture is charged into the fuel chamber whereupon it cures or gels.

Among the vulcanizable rubbery materials which serve as binders in solid rocket compositions are included acid-terminated polymers derived from homopolymers of conjugated dienes. This type of polymer may be exemplified by the formula

HOOC—Q—COOH           (II)

wherein Q is a polymer chain, as for example, a polymer of a conjugated diene such as 1,3-butadiene. In order to produce a solid rocket propellant from this polymer, which is difunctional, it is necessary to cross link the polymer. Cross-linking agents effective for this polymer must be trifunctional or higher in functionality. Therefore, it is a specific restriction of the present invention that the value of $n$ in Formula I be at least 3 or higher.

The compounds of this invention can be prepared by reacting the corresponding halomethyl benzene (Formula III) with a salt of a suitable α,β-unsaturated acid (Formula IV) to produce the desired benzyl ester of Formula I noted above.

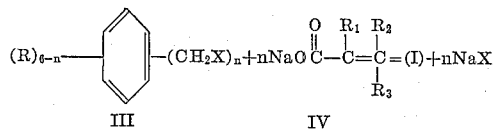

III                             IV wherein R, $R_1$, $R_2$, $R_3$, and $n$ are as defined above and X is a halogen, such as chlorine, bromine or iodine.

The halomethyl benzenes (Formula III) can be prepared by reacting the corresponding benzene with formaldehyde and a hydrogen halide, such as hydrogen chlorine or hydrogen bromide, according to the procedure described in U.S. Pat. Nos. 2,945,894; 2,951,100; 2,973,391 and 3,069,480. Alternative procedures involve hydrogenation of the alkyl groups of benzene in the presence of suitable catalyst (U.S. Pat. No. 2,926,202) or with chlorine sorbed on zeolite and under reactive conditions (U.S. Pat. No. 2,956,084). Also, the halomethylation of an alkyl benzene with formaldehyde and a sodium halide under acid conditions as described in J. Org. Chem. 29, 3245 (1964).

Examples of chloromethyl benzenes (Formula III) which may be used in making the α,β-unsaturated esters of Formula I include 1,2,3-tris(chloromethyl)benzene,
1,2,4-tris(chloromethyl)benzene,
1,3,5-tris(chloromethyl)benzene,
2,3,4-tris(chloromethyl)toluene,
3,4,5-tris(chloromethyl)toluene,
2,4,5-tris(chloromethyl)toluene,
2,4,6-tris(chloromethyl)toluene,
3,4,5-tris(chloromethyl)-o-xylene,
3,5,6-tris(chloromethyl)-o-xylene,
2,4,5-tris(chloromethyl)-m-xylene,
2,4,6-tris(chloromethyl)-m-xylene,
2,5,6-tris(chloromethyl)-m-xylene,
4,5,6-tris(chloromethyl)-m-xylene,
2,3,5-tris(chloromethyl)-p-xylene,
4,5,6-tris(chloromethyl)-1,2,3-trimethylbenzene,
2,5,6-tris(chloromethyl)-1,3,4-trimethylbenzene,
2,4,6-tris(chloromethyl)-1,3,5-trimethylbenzene,
2,2′,2″,2‴-tetrabromomethyldurene and
hexabromomethylbenzene and corresponding compounds containing other lower alkyl substituents ($C_1$–$C_4$) as well as the bromo and iodo homologues.

The α,β-unsaturated acids (Formula IV) which may be reacted with compounds of Formula III as salts to form the esters of Formula I include acrylic acid, 2-methacrylic acid, crotonic acid, 2-methylcrotonic acid, 2,3-dimethylcrotonic acid, 2-ethylacrylic acid, 2-ethylcrotonic acid, 3-bromocrotonic acid, 2-chlorocrotonic acid, cinnamic acid, 2-phenylcinnamic acid, etc. In forming the acid salt, a number of metals including the alkali metals, silver, mercury, copper, etc. as well as ammonia may be employed. However, for economy and minimum side effects, it is preferred to use the sodium or potassium salt.

The reaction between the halomethyl benzene and the salt of the $\alpha,\beta$-unsaturated acid is carried out by contacting suitable quantities of each ingredient in the presence of a suitable solvent at an elevated temperature. The amount of acid salt employed will be dependent upon the number of halomethyl substituents in the molecule of substituted benzene involved. One mole of acid salt is required for each halomethyl substituent per mole of halomethylbenzene, and at least three moles of acid salt per molecule of halomethylbenzene will be required in accordance with the previous restriction discussed above. It is generally preferred to use an excess of acid salt to ensure high yields. Such excesses may range from about 1 to about 50, preferably 5 to 20 mole percent.

The temperature of the reaction may vary widely and will be influenced by the particular acid salt and halomethylbenzene employed as well as the solvent employed. In most instances, the temperature will be in the range of 50 to 250° C., but where possible the range of 50° to 150° C. is preferred.

The solvent employed as the reaction medium may vary widely. The particular solvent chosen should be inert in the reaction or of such a nature that it will not lead to other than the desired product. A preferred solvent is the acid whose salt is used in the reaction, provided such acid is liquid at the reaction temperature. In other cases, dimethylsulfoxide, dimethylformamide or dimethylacetamide are convenient. The amount of solvent employed will vary widely, but should be sufficient to provide a readily stirred mixture.

The reaction between acid salt and halomethylbenzene should be carried out until essentially complete. The time required for complete reaction will vary widely depending upon the specific reactants and the temperature of reaction. Times of from 1 to about 5 hours may be required, and times of about 3 hours have been successful in some cases.

After the reaction is complete the product, the ester of Formula I, is separated by suitable means. A convenient method is by drowning in water, neutralization with alkali, extraction with suitable solvent, drying to remove water, and stripping off the solvent. The particular method employed in recovering the ester intermediate is not a critical part of the present invention and other well known methods may be employed as desired.

The following examples will serve to illustrate the invention. The parts are by weight unless otherwise noted.

EXAMPLE 1

Preparation of 2,4,6-tris(crotonyloxymethyl)-1,3,5-trimethylbenzene

Into a suitable reactor was charged 15.0 parts (0.14 mole) of sodium crotonate, 75 parts of crotonic acid and 17.0 parts (0.042 mole) of 2,4,6-tris(bromomethyl)1,3,5-trimethylbenzene made by the procedure of U.S. Pat. No. 3,168,580. The above mixture was stirred and heated to 150–160° C. and held at this temperature for about 3–4 hours. The solution was then cooled to 90° C. and poured into 1500 parts of water containing 90 parts of sodium bicarbonate with rapid stirring. The product was then extracted with three 150 milliliter portions of ether. The combined extracts were dried over anhydrous calcium chloride and then stripped of solvent under vacuum. The product was obtained in crude form as a tan powdery solid. It was recrystallized from ethanol using activated charcoal to decolorize. There was obtained 10 parts of product as white needles having a melting point of 112–114° C.

This example represents a preferred preparative method for a preferred compound.

EXAMPLE 2

Preparation of 2,4,6-tris(3-(2-methyl-1-aziridinyl) butyryloxymethyl)1,3,5-trimethylbenzene To 5.0 parts (0.088 mole) of 1,2-propyleneimine in a suitable reactor was added 2.0 parts (0.005 mole) of the product of Example 1. The resulting solution was heated to about 70° C. and held at this temperature for about 3–4 hours. The excess imine was then stripped off under vacuum and the desired product was obtained as an almost colorless oil. The product was of sufficient purity to be used in the curing of elastomers without further handling.

This example shows the utility of the products of the present invention as intermediates for the preparation of trifunctional cross-linking agents.

EXAMPLE 3

Use of trifunctional agent as cross-linking agent

To 10.0 parts (5.1 milliequivalents) of a carboxy-terminated polybutadiene of molecular weight 3854 was added 1.0 part (5.1 milliequivalents) of the product of Example 2. The mixture was stirred to ensure thorough blending and then placed in an oven at 65° C. After 3–4 days the mixture had cured to a non-tacky elastomer.

This example shows the utility of trifunctional derivatives of the compounds of the present invention as cross-linking agents for carboxy-terminated polybutadienes used in solid rocket fuels.

EXAMPLE 4

Attempted use of prior art compounds

Following the procedure of Example 3 but substituting for the product of Example 2 an equivalent amount of the reaction product of $\alpha 3,\alpha 5$-durenediol dimethacrylate with 2 molar equivalents of 1,2-propyleneimine, the mixture of carboxy-terminated polybutadiene and reaction product failed to cure to a non-tacky elastomer even atfer one month at the elevated temperature.

This example shows that difunctional reactive compounds are ineffective as cross-linking agents for difunctional polymers.

EXAMPLE 5

A mixture of 9.0 parts (0.02 mole) of $\alpha,\alpha',\alpha'',\alpha'''$-tetrabromomethyldurene, 8.64 parts (0.08 mole) of sodium crotonate, and 25 parts of dimethyl formamide was heated to 125° C. with stirring and held at this temperature for about 45 minutes. The mixture was then cooled to about 100° C. and poured into 150 parts of water with rapid stirring. The product was filtered off and recrystallized from ethanol to yield 8.0 parts (85% of theory) of white needles melting at 107–109° C. Compound is 1,2,4,5-tetrakis (crotonyloxymethyl)benzene.

EXAMPLE 6

A mixture of 6.3 parts (0.01 mole) of hexabromomethylbenzene, 6.6 parts (0.06 mole) of sodium crotonate, and 20 parts of dimethyl formamide was heated to 155° C. and held at this temperature for 5 minutes. It was then cooled to 100° C. and poured into 150 parts of water with rapid stirring. The compound was separated by filtration and recrystallized from methanol. The product was obtained as a white crystalline solid melting at 157–158° C. in the amount of 5.5 parts (82% of theory). Compound is hexakis (crotonyloxymethyl)benzene.

I claim:
1. A compound of the formula

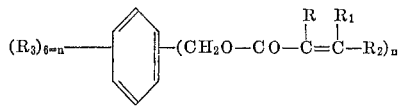

where R, $R_1$, and $R_2$ may be hydrogen, halogen, lower alkyl of up to four carbons, or phenyl; $R_3$ may be hydrogen or lower alkyl of up to four carbons; and $n$ is an integer from 3 to 6 provided that when $n$ of the expression $6-n$ is 3, $R_3$ is a 1,3,5-trimethyl substitution.

2. The compound within the scope of claim 1 which is 2,4,6-tris(crotonyloxymethyl)-1,3,5-trimethylbenzene.

3. The compound within the scope of claim 1 which is tetrakis(crotonyloxymethyl)benzene.

4. The compound within the scope of claim 1 which is hexakis(crotonyloxymethyl)benzene.

References Cited

UNITED STATES PATENTS

| | | | |
|---|---|---|---|
| 2,129,667 | 9/1938 | Barrett et al. | 260—486 XR |
| 2,359,622 | 10/1944 | Coleman et al. | 260—486 XR |
| 2,542,417 | 2/1951 | Kleinschmidt | 260—618 XR |
| 2,830,078 | 4/1958 | Fekete | 260—486 |
| 2,855,434 | 10/1958 | Fekete | 260—486 |
| 2,856,375 | 10/1958 | Mikeska | 260—618 XR |
| 2,965,622 | 12/1960 | Pannell | 260—486 XR |
| 3,022,355 | 2/1962 | Earhart et al. | 260—618 |

LORRAINE A. WEINBERGER, Primary Examiner

P. J. KILLOS, Assistant Examiner

U.S. Cl. X.R.

260—86.7, 239, 469, 476, 651